A. S. GIBB.
APPARATUS FOR DELIVERING WATER FOR IRRIGATION PURPOSES.
APPLICATION FILED AUG. 14, 1911.
1,012,072.
Patented Dec. 19, 1911.
2 SHEETS—SHEET 1.
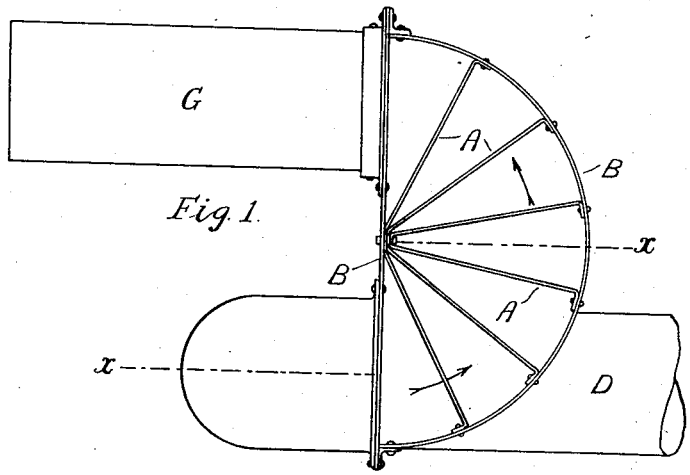
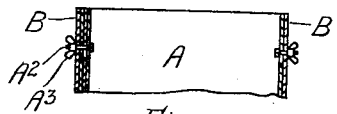
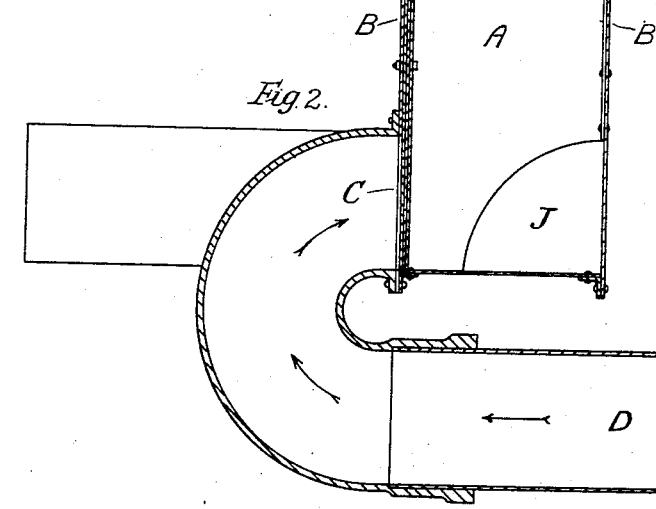
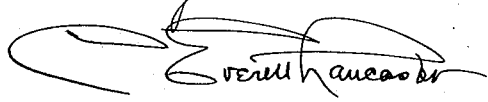

A. S. GIBB.
APPARATUS FOR DELIVERING WATER FOR IRRIGATION PURPOSES.
APPLICATION FILED AUG. 14, 1911.

1,012,072.

Patented Dec. 19, 1911.

2 SHEETS—SHEET 2.

UNITED STATES PATENT OFFICE.

ANDREW SHIRRA GIBB, OF PUNJAB, INDIA.

APPARATUS FOR DELIVERING WATER FOR IRRIGATION PURPOSES.

1,012,072. Specification of Letters Patent. Patented Dec. 19, 1911.

Application filed August 14, 1911. Serial No. 643,963.

*To all whom it may concern:*

Be it known that I, ANDREW SHIRRA GIBB, a subject of the King of the United Kingdom of Great Britain and Ireland, and residing at Punjab, India, have invented a certain new and useful Improvement in Apparatus for Delivering Water for Irrigation Purposes, of which the following is a specification.

This invention relates to improvements in self-regulating apparatus such as described in the specification of Letters Patent No. 859935 which apparatus water, as for example, from a distributing channel, is delivered to a watercourse for irrigation, or from a filter-bed to a filtered water tank, or other purpose, and by means of which apparatus a constant or approximately constant discharge is maintained notwithstanding variations of the head in the distributing channel, filter or other source of supply.

The invention consists in an improved construction of apparatus in which the sills or weirs referred to in the said patent are dispensed with and the plates for dividing into compartments the chamber through which the water flows are so formed at their lower edges that in conjunction with said chamber a passage is formed of a cross sectional shape corresponding substantially to that of the stream of water flowing through said chamber.

The invention is illustrated by way of example in the accompanying drawings in which—

Figure 3:
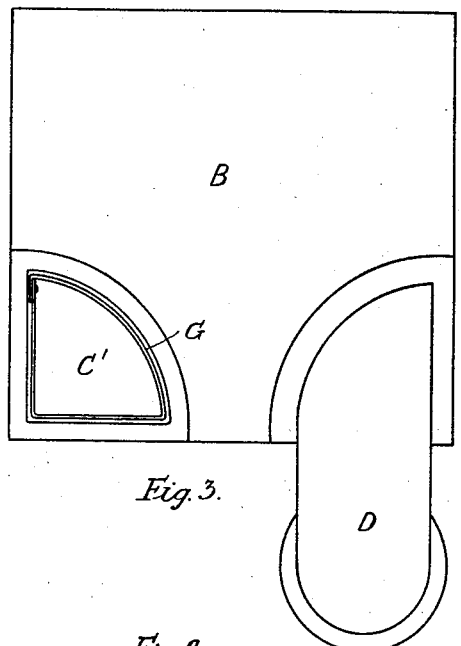
Figure 4:
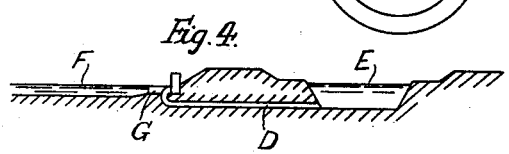
Figure 5:
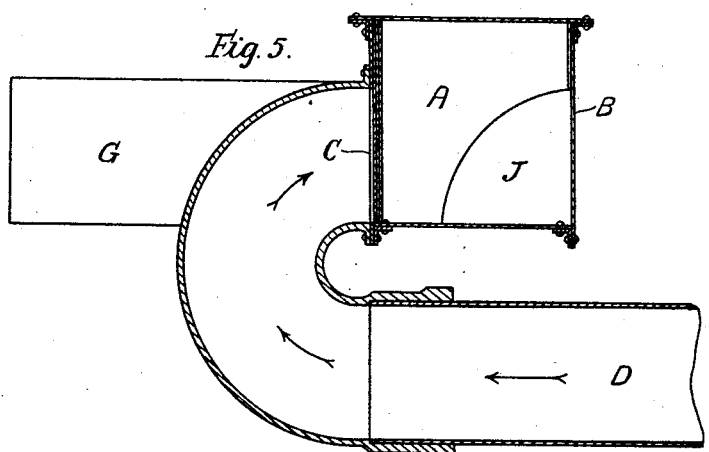

Figure 1 is a plan of the improved apparatus: Fig. 2 is a vertical section on the line x—x, Fig. 1: Fig. 3 is an elevation at right angles to Fig. 2: Fig. 4 is a longitudinal vertical section on a reduced scale showing diagrammatically the apparatus and relative pipe connections so arranged as to pass water from a distributing channel to a watercourse: Fig. 5 is a vertical section showing a modification and Figs. 6 and 7 show further modifications.

Referring to the drawings, the said apparatus comprises a series of vertical plates A which are fitted approximately radially in a D-shaped chamber formed by plates or walls B and are curved at their lower edges to a form corresponding to that assumed by the surface of the water as it flows through said chamber, said edges in conjunction with the lower part of said chamber constituting a preferably semi-circular passage J having a cross sectional shape corresponding substantially to that of the stream of water flowing through said chamber. The said chamber is provided with inlet and outlet ports C, C¹, respectively, preferably of the same shape as the cross-sectional shape of the passage J, pipes D serving to conduct the water from the distributary channel E to the inlet port C, and a branch pipe connection, such as G, serving to conduct to the watercourse F the water which has flowed around the passage J to the outlet port C¹.

The regulation of the water supply is effected by directing the water from the inlet pipe connections D to the outlet connection G, by way of the passage J, in which passage the required discharge of water can flow, without obstruction, under the edges of the plates A; but if the head be increased, the vortex or rotational condition of flow, by virtue of which condition water rises toward the outer periphery, is interrupted in the surface layers of water by the plates A and the water, the flow of which is thus obstructed, flows down toward the center of the curve, and in so doing generates a circulating radial or cross flow in the compartments between the plates A, which flow eliminates, retains or dissipates and renders ineffective for the purpose of delivering water head or energy in the water which may be in excess of that required, and so insures a constant discharge.

With respect to its function in rendering excess head ineffective for delivering water in the manner above described, each compartment formed within the D-shaped chamber by means of the plates A, is capable of acting as a separate unit; and, when the excess of head is so great that it cannot all be disposed of in the upstream compartment, the remaining excess is dealt with in the succeeding compartments in the same manner until only the required head remains and the water then flows unobstructed under the edges of the remaining plates A and only the required discharge is delivered, notwithstanding the excess of head.

The D-shaped chamber is preferably provided with a flat bottom, as shown. The said chamber may be of considerable height and open at the top, as shown in Fig. 2, or it may be closed at the top, as shown in Fig. 5, so as to allow of the action taking place partially under pressure, in which case the height of the apparatus may be reduced, as indicated in Fig. 5.

The edges of the plates A where they conform to the section of the surface of the curved stream may be deflected, as at A¹, Fig. 6, so as to meet the stream efficiently and separate the surface layer of water, which the plates A obstruct, from the onflowing water beneath. The plates A may be so fitted that they may be raised and lowered in the D-shaped chamber, as desired, so as to permit of the regulated discharge of water being increased or decreased at will. As shown, for example in Fig. 7, the plates A are slotted and are adapted to be held in desired position by means of bolts A² provided with wing nuts A³, which bolts pass through the slots in said plates and through holes in the walls B of said D-shaped chamber.

Having now described my invention what I claim and desire to secure by Letters Patent of the United States is:—

1. Self regulating apparatus for delivering a constant supply of water for irrigation, or like purposes, comprising a D-shaped chamber having ports serving to afford communication between a watercourse or the like and its source of supply, pipe connections leading from said source of supply to said chamber and from said chamber to said water-course or the like, and vertical partitions dividing the said chamber into compartments, the lower edges of said partitions being curved so as to constitute in conjunction with the lower part of said chamber a passage having a cross sectional form or shape corresponding substantially to that of the stream of water flowing through said chamber, substantially as described.

2. Self regulating apparatus for delivering a constant supply of water for irrigation, or like purposes, comprising a D-shaped chamber adapted to be closed at its upper end and having ports serving to afford communication between a watercourse or the like and its source of supply, pipe connections leading from said source of supply to said chamber and from said chamber to said water-course or the like, and vertical partitions dividing the said chamber into compartments, the lower edges of said partitions being curved so as to constitute in conjunction with the lower part of said chamber a passage having a cross sectional form or shape corresponding substantially to that of the stream of water flowing through said chamber, substantially as described.

3. Self regulating apparatus for delivering a constant supply of water for irrigation, or like purposes, comprising a D-shaped chamber having ports serving to afford communication between a watercourse, or the like and its source of supply, pipe connections leading from said source of supply to said chamber and from said chamber to said water-course or the like, and vertical partitions dividing the said chamber into compartments, the lower edges of said partitions being curved so as to constitute in conjunction with the lower part of said chamber a passage having a cross sectional form or shape corresponding substantially to that of the stream of water flowing through said chamber, said curved lower edges being deflected, substantially as described.

4. Self regulating apparatus for delivering a constant supply of water for irrigation, or like purposes, comprising a D-shaped chamber having ports serving to afford communication between a water-course or the like and its source of supply, pipe connections leading from said source of supply to said chamber and from said chamber to said water-course or the like, and vertical partitions adapted to be raised and lowered dividing the said chamber into compartments, the lower edges of said partitions being curved so as to constitute in conjunction with the lower part of said chamber a passage having a cross sectional form or shape corresponding substantially to that of the stream of water flowing through said chamber, substantially as described.

5. Apparatus for delivering a regulated supply of water for irrigation, or like purposes, comprising a D-shaped chamber divided into compartments and having ports serving to afford communication between a watercourse or the like and its source of supply, pipe connections leading from said source of supply to said chamber and from said chamber to said water-course or the like, and plates adapted to be raised and lowered in relation to said chamber the lower edges of said plates being curved so as to constitute in conjunction with the lower part of said chamber a passage having a cross sectional shape corresponding substantially to that of the stream of water flowing through said chamber, substantially as described.

In testimony whereof I have signed my name to this specification in the presence of two subscribing witnesses.

ANDREW SHIRRA GIBB.

Witnesses:
 JOHN McCLEARY,
 THOMAS BISHOP GRAHAM.